(12) United States Patent
Lawrence

(10) Patent No.: US 10,259,566 B1
(45) Date of Patent: Apr. 16, 2019

(54) ROLLING VORTEX WING SLAT SYSTEM AND METHOD OF USE

(71) Applicant: James Randolph Lawrence, LaGrange, TX (US)

(72) Inventor: James Randolph Lawrence, LaGrange, TX (US)

(*) Notice: Subject to any disclaimer, the term of this patent is extended or adjusted under 35 U.S.C. 154(b) by 317 days.

(21) Appl. No.: 15/259,949

(22) Filed: Sep. 8, 2016

Related U.S. Application Data

(60) Provisional application No. 62/349,203, filed on Jun. 13, 2016.

(51) Int. Cl.
*B64C 21/08* (2006.01)
*B64C 23/06* (2006.01)

(52) U.S. Cl.
CPC .............. *B64C 21/08* (2013.01); *B64C 23/06* (2013.01)

(58) Field of Classification Search
CPC .................. B64C 21/08; B64C 23/06
See application file for complete search history.

(56) References Cited

U.S. PATENT DOCUMENTS

| | | | | |
|---|---|---|---|---|
| 1,913,169 A * | 6/1933 | Martin | ..................... | B64C 21/02 244/198 |
| 2,406,475 A * | 8/1946 | Rogers | ..................... | B64C 21/02 244/210 |
| 2,507,611 A * | 5/1950 | Pappas | ..................... | B64C 21/02 244/198 |
| 2,755,039 A * | 7/1956 | Davie, Jr. | ................. | B64C 9/24 244/187 |
| 3,232,563 A * | 2/1966 | Langfelder | ............... | B64C 9/32 244/213 |
| 3,576,301 A * | 4/1971 | Stickle | ..................... | B64C 21/02 244/216 |
| 4,398,688 A * | 8/1983 | Williams | ................... | B64C 3/50 244/207 |
| 4,544,117 A * | 10/1985 | Schuster | .................... | B64C 9/24 244/210 |
| 5,056,741 A * | 10/1991 | Bliesner | .................... | B64C 9/24 244/210 |
| 6,334,753 B1 * | 1/2002 | Tillman | ................... | B64C 21/04 415/1 |
| 6,378,802 B1 * | 4/2002 | Saiz | .......................... | B64C 3/14 244/130 |
| 7,708,229 B1 * | 5/2010 | Angle, II | ................ | B64C 21/08 244/206 |
| 7,832,689 B2 * | 11/2010 | Prince | ..................... | B64C 23/06 244/200.1 |
| 8,657,238 B2 * | 2/2014 | Fox | ........................... | B64C 9/24 244/204.1 |
| 8,672,627 B2 * | 3/2014 | Yeh | ....................... | B64C 27/615 416/146 R |
| 2017/0355451 A1 * | 12/2017 | Zha | ........................ | B64C 21/025 |
| 2018/0099737 A1 * | 4/2018 | Wright | ...................... | B64C 3/58 |

* cited by examiner

*Primary Examiner* — Richard R. Green
*Assistant Examiner* — Michael B. Kreiner
(74) *Attorney, Agent, or Firm* — Eldredge Law Firm, LLC; Richard Eldredge; Beth Felix

(57) ABSTRACT

An aircraft includes an elongated wing having a leading edge extending to a trailing edge, an upper surface extending from the leading edge to the trailing edge, and a lower surface extending from the leading edge to the trailing edge; an air passage forming an entrance opening at the leading edge and configured to extend to an exit opening positioned at the upper surface; and an airflow stop configured to control airflow movement through the air passage.

8 Claims, 4 Drawing Sheets

ROLLING VORTEX WING SLAT SYSTEM AND METHOD OF USE

BACKGROUND

1. Field of the Invention

The present invention relates generally to systems and methods for controlling flow over an airfoil.

2. Description of Related Art

Aircraft airfoils are well known in the art and are effective means to create lift. For example, FIGS. 1A and 1B depict a simplified cross-sectional view of a conventional airfoil 101 having reduced and increased pressure surfaces that extend from the leading to the trailing edges of the body. A plurality of arrows is utilized to depict the airflow around the airfoil, which in FIG. 1B is shown separated at the trailing edge.

One common problem associated with airfoils is the disruption of airflow around the airfoils from the upper surface of the airfoil at low airspeeds and at a high angle of attack resulting in a loss of lift or stall condition. A stall condition can lead to a loss of control incident.

Accordingly, there is a need to actively manipulate airflow around the airfoil at low airspeeds when the wing angle of attack is increased in order to eliminate or reduce airflow separation from the upper wing surface. Additionally, this needs to be done in a manner that does not increase the induced drag at this critical stage of flight.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1A:
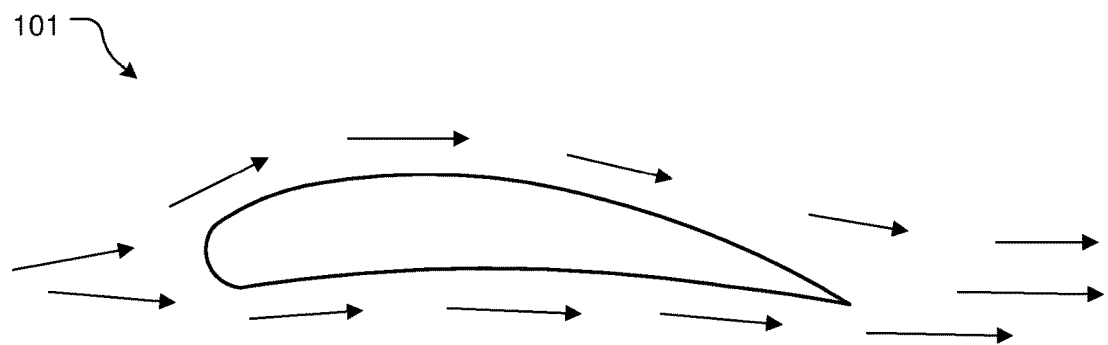
FIGS. 1A and 1B are simplified cross-sectional views of a conventional aircraft airfoil during use.
Figure 1B:
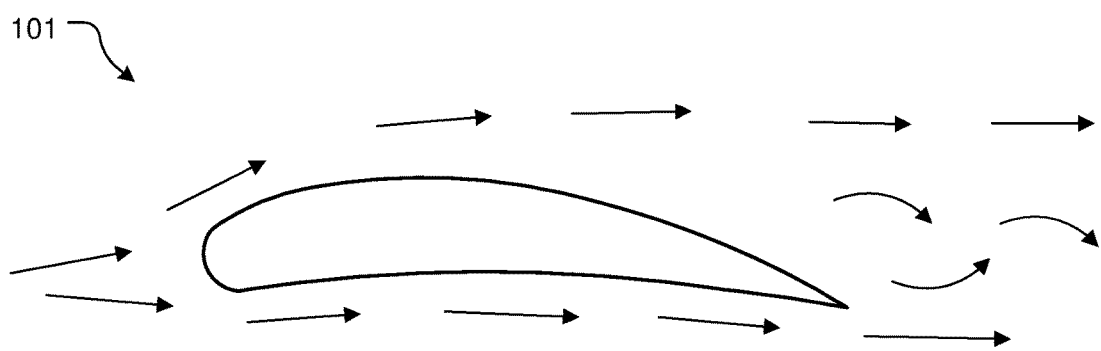
Figure 2:
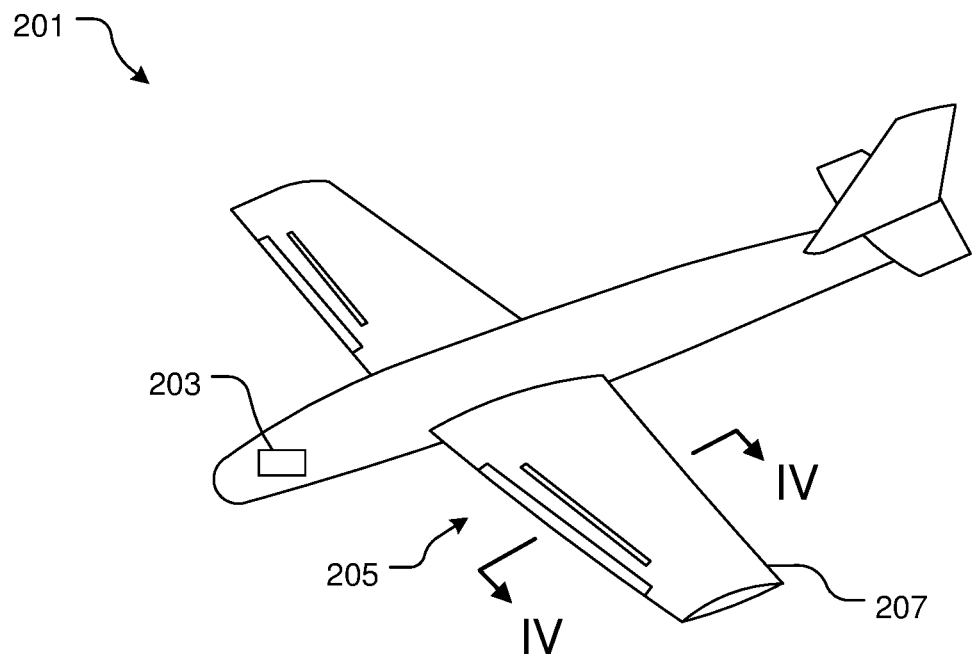
FIG. 2 is an oblique view of an aircraft having the flow control system in accordance with a preferred embodiment of the present invention.
Figure 3:
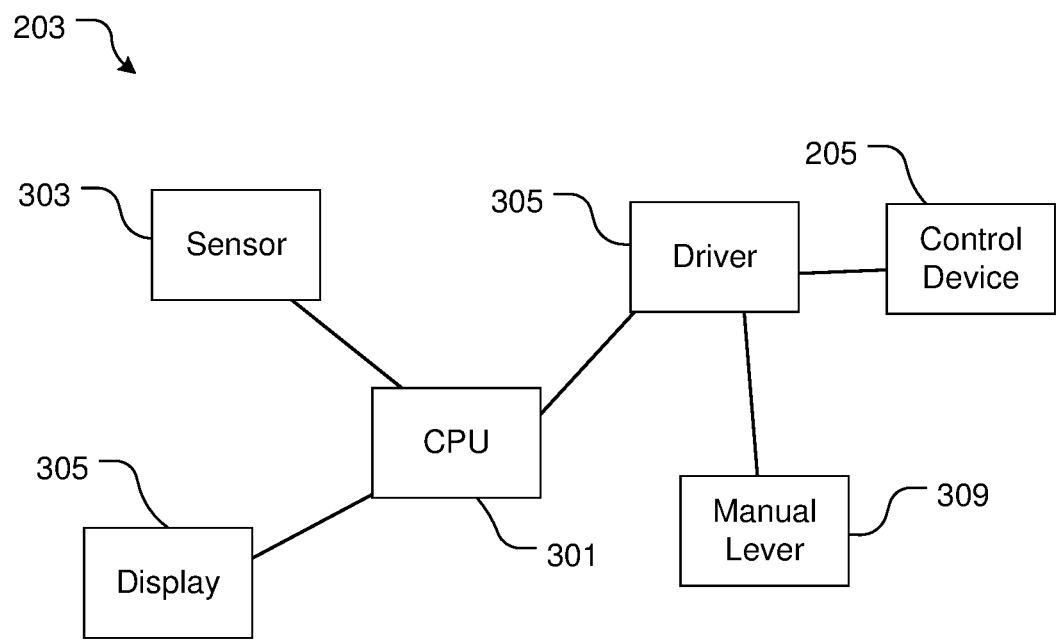
FIG. 3 is a simplified schematic of the control system of FIG. 2.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, which will vary from one implementation to another. Moreover, it will be appreciated that such a development effort might be complex and time-consuming, but would nevertheless be a routine undertaking for those of ordinary skill in the art having the benefit of this disclosure.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIGS. 2-6 depict various views of an aircraft with a wing airflow control system in accordance with preferred embodiments of the present application. It will be appreciated that the system discussed herein overcomes one or more of the above-listed problems commonly associated with airfoils.

In the contemplated embodiment, aircraft 201 could include manual, automatic, or both methods of activation to include symmetrical (both wings simultaneously) or asymmetrical activation based on pilot or sensor inputs. Aircraft 201 preferably includes one or more of a wing airflow control system 203 operably associated with the aircraft wing 207. The system includes a computer 301 configured to communicate with one or more sensors adapted to determine whether flow correction around the airfoil 207 is required. If so, one or more wing control device 205 are utilized to manipulate the airflow until a desired flow around the airfoil is achieved.

The control system 203 is further provided with a display 305 in data communication with the computer 301 and configured to provide visual notification of the airflow around the airfoil. If modification to the airflow is required, the computer 301 commands a driver 305 to manipulate movement of the wing control device 205. In an alternative embodiment, a manual lever 309 could be utilized to manually manipulate the control device via the driver. In one embodiment, the driver is a hydraulic actuator; however, alternative embodiments could use electric motors or the like in lieu of the preferred embodiment.

Figure 4:
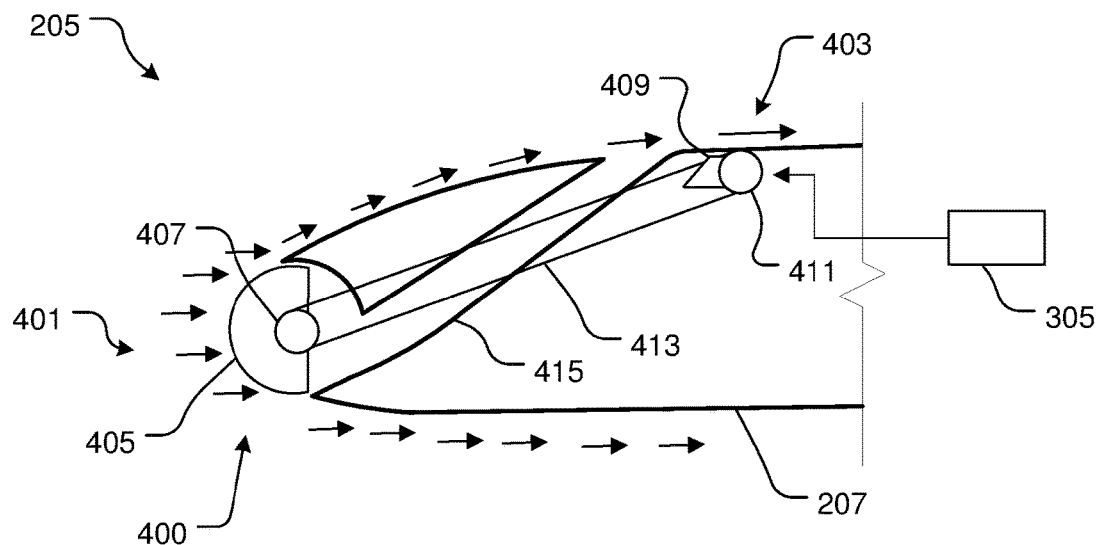
FIGS. 4 and 5 are cross-sectional views of the airfoil and control system of the aircraft of FIG. 2 taken at IV-IV.
Figure 5:
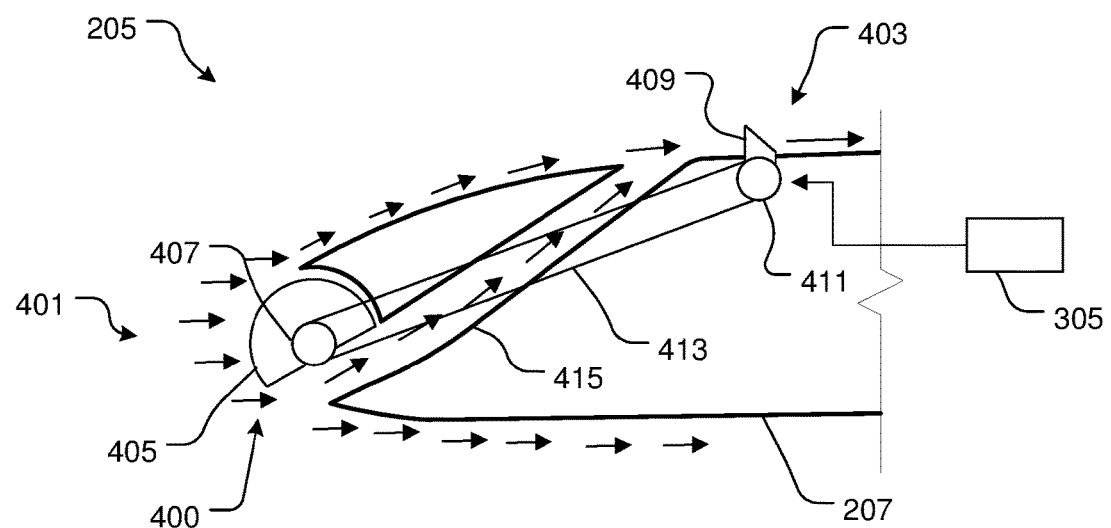

Referring specifically to FIGS. 4 and 5, cross-sectional side views of the airfoil 207 and airflow control device 205 are shown. In FIG. 4, the control device is not active, while in FIG. 5 the control device is activated.

The wing control device 205 comprises of a rolling leading edge 401 and a vortex generator 403. The combination of the leading edge 401 and the vortex generator 403 provides effective means to correct adverse airflow around the airfoil 207. It should be understood that conventional vortex generators on a conventional wing are required to be at the front of the wing because at a high angle of attack, the front of the airfoil is the only place wherein the stationary vortex generator is effective during operation. Whereas, the present invention utilizes air from the leading edge and feeds the vortex generators at a location wherein flow separation is prevented at an earlier stage.

The rolling leading edge 401 includes an airflow stop 400, which in the preferred embodiment is an elongated cylindrical drum 405 rigidly attached to a shaft 407 extending lengthwise along the airfoil 207, which in turn is rotatably attached to one or more ribs (not shown) disposed within the airfoil 207. The vortex generator includes a vane 409 configured to manipulated the airflow and is rigidly attached to a second shaft 407 extending lengthwise along the airfoil 207 and rotatably attached to one or more rib disposed within the airfoil.

The control device 205 is further provided with a passage 415 extending from the leading edge to the suction surface of the airfoil 207. As shown in FIG. 4, the rolling leading edge drum 405 blocks the airflow from traveling through passage 415, while the rotation of the drum 405 allows flow therethrough the passage. Also rotational movement of the drum preferably causes the vane 409 to rotate and extend outside the suction surface, which in turn allows manipulation of the airflow around the airfoil.

In the exemplary embodiment, it is preferred that that two shafts 407 and 411 are connected via a belt 413, chain, and/or other suitable device. The rotational movement of the shaft 411 causes rotation of both the drum 405 and the vane 409.

Figure 6:
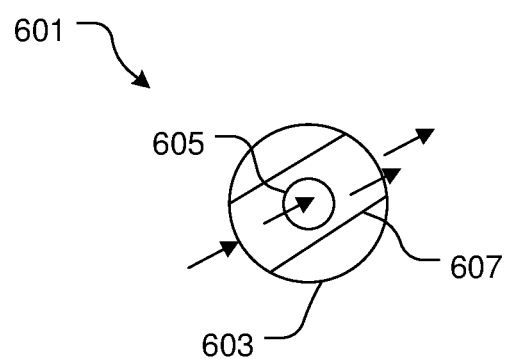
FIG. 6 is a side view of a rolling leading edge in accordance with an alternative embodiment.

In FIG. 6, a simplified front view of a rolling leading edge 601 is shown in accordance with an alternative embodiment. The leading edge 601 includes a drum 603 secured to a shaft 605 and forms a drum passage 607 extending therethrough. Accordingly, it is desired to have the airflow pass directly through the drum in lieu of the side. It will be appreciated that the system discussed herein could utilize leading edge 601 or leading edge 401. Further, other embodiments could include modifications of the leading edges discussed herein, which fall within the overall spirit of the present invention.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. An aircraft, comprising:
   an elongated wing having a leading edge extending to a trailing edge, an upper surface extending from the leading edge to the trailing edge, and a lower surface extending from the leading edge to the trailing edge;
   an air passage forming an entrance opening at the leading edge and configured to extend to an exit opening positioned at the upper surface; and
   an airflow stop configured to control airflow movement through the air passage;
   wherein air traveling through the passage enters from the leading edge via the entrance opening and exits about the upper surface via the exit opening;
   the airflow stop comprising:
   an elongated drum having a length that extends a partial length of the elongated wing;
   wherein the elongated drum rotates relative to the leading edge;
   wherein the elongated drum is rotatably secured to a first shaft extending the elongated length of the leading edge;
   the aircraft further comprising:
   a second shaft disposed within the elongated wing and operably associated with the first shaft;
   wherein rotational movement of the second shaft causes rotational movement of the first shaft;
   the aircraft further comprising:
   a control system configured to rotate the second shaft;
   wherein the control system restricts air flowing through the passage via manipulation of the airflow stop;
   the aircraft further comprising:
   a vane secured to the second shaft;
   wherein rotation of the second shaft causes the vane to rotate.

2. The aircraft of claim 1, further comprising:
   a control system configured to manipulate the airflow stop;
   wherein the control system restricts air flowing through the passage via manipulation of the airflow stop.

3. The aircraft of claim 1, further comprising:
   an actuator secured to the second shaft;
   wherein the actuator drives the rotational movement of the second shaft.

4. The aircraft of claim 3, wherein the vane is in gaseous communication with air channeled through the passage.

5. The aircraft of claim 1, further comprising:
   a belt secured to both the first shaft and the second shaft.

6. A method to control airflow around an airfoil, comprising:
   providing the aircraft of claim 1;
   channeling air through the passage; and
   restricting the amount of air flowing through the passage with the airflow stop.

7. The method of claim 6, further comprising:
   rotating a vane in an airflow path of the air channeled through the passage.

8. The method of claim 6, further comprising:
   controlling the movement of the airflow stop with an actuator operably associated with a control system.

* * * * *